United States Patent [19]
Mizera et al.

[11] Patent Number: 6,144,994
[45] Date of Patent: Nov. 7, 2000

[54] INTERFACE FOR FLEXIBLE ADDRESS BANDWIDTH ALLOCATION

[75] Inventors: Robert B. Mizera; Thomas A. Peterson; Shu C. Yuan, all of Naperville, Ill.

[73] Assignee: Lucent Technologies Inc., Murray Hill, N.J.

[21] Appl. No.: 09/104,525

[22] Filed: Jun. 25, 1998

[51] Int. Cl.[7] ........................... G06F 15/167; G06F 15/17
[52] U.S. Cl. .................. 709/212; 709/250; 709/226; 709/233; 710/36
[58] Field of Search .................................. 709/250, 212, 709/226, 233, 239; 710/36, 100; 364/200, 201; 711/157

[56] References Cited

U.S. PATENT DOCUMENTS

| | | | |
|---|---|---|---|
| 4,207,609 | 6/1980 | Luiz et al. | 364/200 |
| 4,381,543 | 4/1983 | Bunten, III et al. | 364/200 |
| 5,297,262 | 3/1994 | Cox et al. | 710/36 |
| 5,953,318 | 9/1999 | Nattkemper et al. | 370/236 |

OTHER PUBLICATIONS

Stockton, Electronic Engineering Times, "Making RISC chips work in embedded controllers", Apr. 15, 1991.

*Primary Examiner*—Mark H. Rinehart
*Assistant Examiner*—Ivan C. Pierce, III
*Attorney, Agent, or Firm*—Steve Mendelsohn

[57] ABSTRACT

A processor is connected to one or more controlled devices (e.g., ASICS) using an interface that has a plurality of bandwidth distribution devices (i.e., a controller device and one or more adjunct devices) configured in an architecture having two or more levels. Each bandwidth distribution device receives an allocation of address bandwidth from a device in the next higher level and distributes that allocation of address bandwidth to one or more devices in the next lower level, each of which is either another bandwidth distribution device or a controlled device. Each bandwidth distribution device can be configured independently in different configuration modes that determine how its available address bandwidth is distributed to devices in the next lower level. The different configuration modes allow the number of devices in the next lower level to be traded off with the amount of bandwidth available to a particular device in the next lower level. In this way, the interface architecture of the present invention can be used to support a wide variety of applications in which the number of controlled devices varies from application to application and the amount of required address bandwidth varies from controlled device to controlled device within an application.

30 Claims, 2 Drawing Sheets

INTERFACE FOR FLEXIBLE ADDRESS BANDWIDTH ALLOCATION

BACKGROUND OF THE INVENTION

1. Field of the Invention

The present invention relates to computer architecture design, and, in particular, to hardware and/or software interfaces between devices in a multi-processor computer system, such as those designed for telecommunications.

2. Description of the Related Art

Telecommunications systems that support the transmission of signals between multiple pairs of non-co-located end users are complex computer systems that have nodes distributed over the telecommunications network, where each node in the network supports specific functions such as the switching and routing of incoming signals to appropriate destinations. Each node may have multiple processors that are designed and/or programmed to support the node's various functions. These processors communicate with one another using specified interface protocols to work together to achieve the node's functions.

Traditionally, whenever a new telecommunications system with a different set of functions and/or a different set of performance capabilities was needed, new nodes would have to be designed to meet the requirements of the new system. The design of the new nodes could be based on existing nodes designed for existing systems, but a large amount of design effort was still needed to meet the requirements of the new system.

SUMMARY OF THE INVENTION

The present invention is directed to a flexible standard architecture for nodes in a computer network, such as a telecommunications network, that can be used to implement specific nodes with a wide range of functions and performance capabilities. In particular, the present invention is directed to a flexible scheme for allocating address bandwidth between a processor and one or more other devices in a node of a computer network. The scheme of the present invention allows nodes to be designed with different numbers of processors for different sets of functions and different sets of performance capabilities, without having to design entirely new computer architectures for each different type of node.

In one embodiment, the present invention is an interface for connecting a processor to one or more controlled devices. The interface comprises a plurality of bandwidth distribution devices arranged in two or more levels. Each bandwidth distribution device in each level has an allocation of available bandwidth and is configurable in a plurality of configuration modes that determine how the available bandwidth is allocated to one or more devices in the next lower level. Each of the one or more devices in the next lower level is either another bandwidth distribution device or a controlled device.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
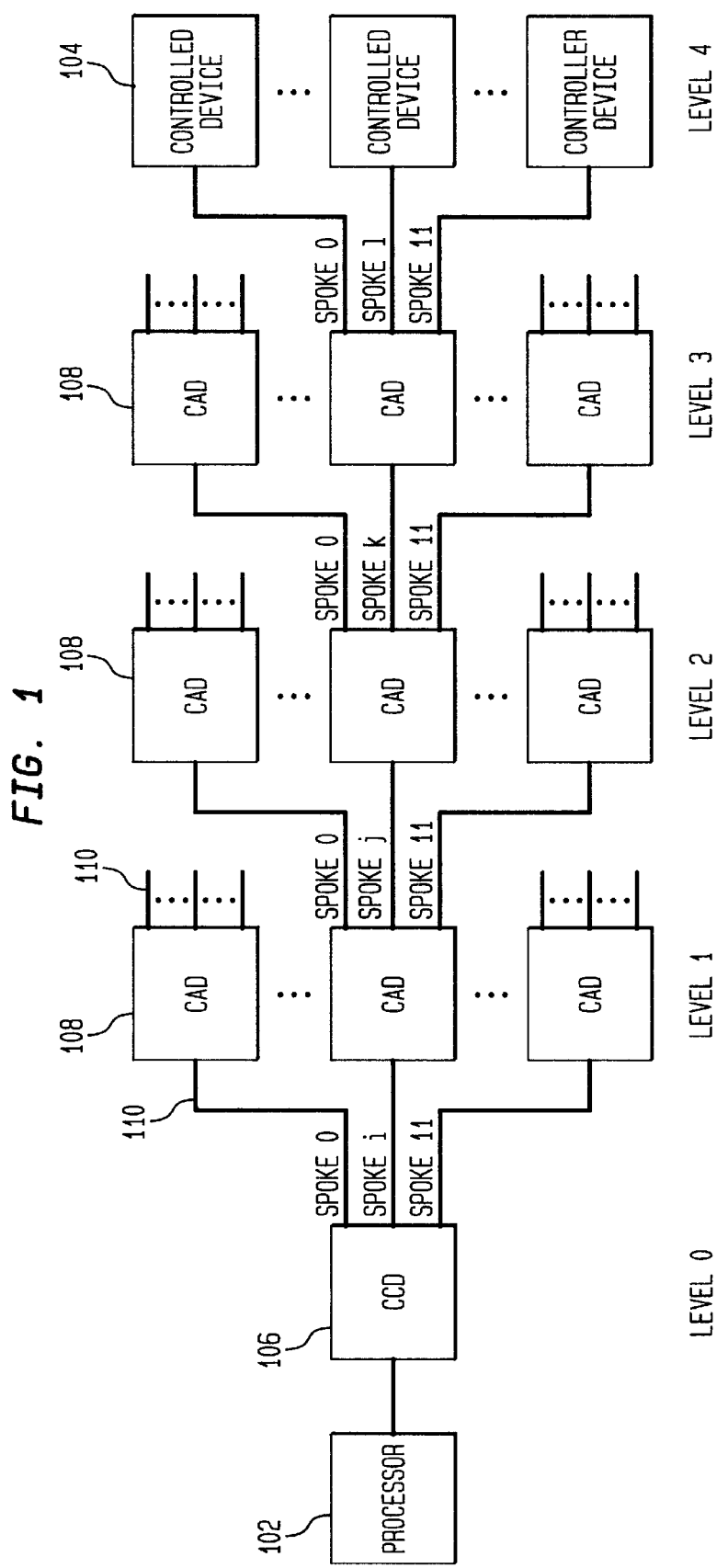
FIG. 1 shows a block diagram providing a generic representation of the interface architecture that supports a flexible address bandwidth allocation scheme, according to one embodiment of the present invention.

Depending on the desired functions and performance capabilities, a node in a computer network, such as a telecommunications network, may need to be designed with multiple processors to meet its processing requirements, with different processors designed and/or programmed to support different types of functions, such as signal transmission or timing. The number of processors, the types of processors, and the different functions provided by those processors may vary from node to node, both within a computer network as well as between different computer networks. However many processors are in a node, they will need to communicate with one another to achieve the node's functional requirements. Depending on their particular functions, different processors within a node may require different amounts of data to be transmitted to and from other nodes. The present invention is directed to a flexible scheme for allocating address bandwidth from one processor to a set of other processors, where the number of other processors and the amount of address bandwidth required by those other processors can vary from node to node.

In one embodiment, the present invention is a control interface for devices (CTLI-D) that forms the physical interface between a processor core for a given design and one or more devices that require a control interface, such as application-specific integrated circuits (ASICs). For purposes of this specification, these latter devices, whether they are ASICs or some other type of device, are referred to generally as "controlled devices." The physical interface is implemented as a CTLI-D controller device (CCD) and, if necessary, one or more CTLI-D adjunct devices (CADs). CTLI-D provides a flexible scheme for allocating the address bandwidth of the processor core to the one or more controlled devices.

The CCD is connected directly to the processor core and provides the parallel-to-parallel, parallel-to-serial translation required for operation of the controlled devices. The CCD is the master entity in any CCD-to-controlled-device or CCD-to-CAD transactions. The CCD provides the master translation function between a control function and the information bus and control signals terminated, for example, by transmission devices. The CCD provides transparent operation of devices by software.

The CCD translates processor bus transactions into CTLI-D transactions as virtual individual spokes that can be terminated directly by controlled devices (e.g., ASICs) or by CADs in extended or expanded applications. The CCD master can directly support up to twelve entities on its bus.

A CAD is much like the CCD on the controlled device side. A CAD can be used on a circuit pack (or board) without a processor and interfaces to a pack with a controller via an extended information bus and backplane buffers and traces. A CAD, like a controlled device, is a slave to the CCD. CADs can be nested in a plurality of levels, thereby increasing exponentially the number of controlled devices that can be slaved to a single processor.

A CAD is required on circuit packs that do not contain a control function when more than one controlled device needs to be supported. A CAD translates an individual spoke from a CCD into a bus for use by the controlled devices on the circuit pack. A CAD decomposes the group chip select received from the spoke into individual chip selects. A CAD collects the composite service requests (CSRs) from the controlled devices into a single group CSR for transport back to the CCD.

FIG. 1 shows a block diagram providing a generic representation of the CTLI-D architecture that supports a flexible address bandwidth allocation scheme, according to one embodiment of the present invention. In this embodiment, a processor 102 communicates with one or more controlled devices 104. The available address bandwidth from processor 102 is allocated to the controlled devices 104 by a CTLI-D controller device 106 and a network of CTLI-D adjunct devices 108, which are interconnected by spokes 110. Although the interconnection between each CCD or CAD and the devices in the next lower level is preferably a tri-state bus arrangement, it can be characterized as a set of individual virtual buses, where each virtual bus provides the interconnection between a CCD/CAD and one device in the next lower level.

CCD 106 and CADs 108 may be referred to as "bandwidth distribution devices," since they distribute allocations of available address bandwidth from a higher-level device to one or more lower-level devices in the computer architecture. The architecture of FIG. 1 can be used to implement nodes in which processor 102 is a microprocessor and each controlled device 104 is an ASIC, where CCD 106 may be implemented as a field programmable gate array (FPGA) or incorporated into a larger ASIC and each CAD 108 is implemented as an FPGA, although other implementations are also possible.

According to this embodiment of the present invention, CCD 106 provides the interface between processor 102 and up to twelve devices which may be any combination of Level 1 CADs 108 and controlled devices 104. In other words, the right side of CCD 106 can be connected directly to m Level 1 CADs 108 and n controlled devices 104 via m+n spokes 110, where $0 \leq m \leq 12$, $0 \leq n \leq 12$, and $0 \leq m+n \leq 12$. Although FIG. 1 indicates the presence of twelve CADs 108 in Level 1, it should be understood that, for a particular embodiment, the number of devices in Level 1 can be less than 12 and any one or more (including all) of those devices can be controlled devices 104, rather than CADs 108.

Similarly, each Level 1 CAD provides the interface between CCD 106 and up to twelve devices which may be any combination of Level 2 CADs 108 and controlled devices 104. Similarly, each Level 2 CAD provides the interface between a Level 1 CAD and up to twelve devices which may be any combination of Level 3 CADs 108 and controlled devices 104; and each Level 3 CAD provides the interface between a Level 2 CAD and up to twelve controlled devices 104.

Depending on the number of levels and the number and types of devices within each level, the generic interface architecture of FIG. 1 can be used to implement different nodes in which processor 102 is connected to anywhere from one controlled device 104 up to $12^4$ or 20,736 controlled devices 104. The limit of 12 for the maximum number of devices that can be connected to the right side of CCD 106 and each CAD 108 is specific to this particular embodiment of the present invention and can be greater or smaller for other embodiments. Similarly, the limit of 3 for the maximum number of levels of CADs 108 in the architecture is specific to this particular embodiment, and greater or smaller maximum numbers of levels are also possible. As such, the upper limit of 20,736 controlled devices 104 may be different for different embodiments of the present invention.

CCD 106 and each CAD 108 can be configured in one of five different configuration modes that determine how the bandwidth available at that node can be further allocated to one or more devices in the next lower level. These five different configuration modes are summarized in Table I. The following discussion of the five configuration modes applies to CCD 106. Application of the five configuration modes to any CAD 108 follows by analogy. Note that the allocation of address bandwidth to the various spokes is fixed for each mode and does not depend on whether there are in fact lower-level devices connected via those spokes.

TABLE I

CONFIGURATION MODE DEFINITIONS

| CONFIGURATION MODE | DESCRIPTION |
| --- | --- |
| Native or $\frac{1}{16}$ | $\frac{1}{16}$ B/W on Spokes 0–11 |
| $\frac{1}{8}$ | $\frac{1}{8}$ B/W on Spoke 0; $\frac{1}{16}$ B/W on Spokes 2–11 |
| $\frac{1}{4}$ | $\frac{1}{4}$ B/W on Spoke 0; $\frac{1}{16}$ B/W on Spokes 4–11 |
| $\frac{1}{2}$ | $\frac{1}{2}$ B/W on Spoke 0; $\frac{1}{16}$ B/W on Spokes 8–11 |
| Clear Channel | All B/W on Spoke 0 |

In Native or $\frac{1}{16}$ Mode, CCD 106 is directly connected to up to 12 Level 1 devices, which may be any combination of CADs 108 and controlled devices 104. In Native Mode, each Level 1 device is allocated one sixteenth of the address bandwidth available at CCD 106. When CCD 106 is in $\frac{1}{16}$ Mode, it may be connected to less than 12 Level 1 devices, but each Level 1 device is still allocated only one sixteenth of the address bandwidth available at CCD 106. In that case, one or more spokes 110 are left unused.

In $\frac{1}{8}$ Mode, CCD 106 is directly connected to no more than eleven Level 1 devices, where Spoke 1 cannot be used (i.e., no Level 1 device can be connected to CCD 106 via Spoke 1 when CCD 106 is in $\frac{1}{8}$ Mode). In $\frac{1}{8}$ Mode, if a Level 1 device is connected to CCD 106 via Spoke 0 (whether it is a CAD 108 or a controlled device 104 ), it is allocated one eighth of the address bandwidth available at CCD 106, while up to another ten Level 1 devices may be connected to CCD 106 via Spokes 2–11 (whether they are CADs 108 or controlled devices 104 ) and are each allocated one sixteenth of the CCD's address bandwidth. Effectively, the address bandwidths for Spokes 0–1 in Native Mode are both allocated to Spoke 0 in $\frac{1}{8}$ Mode.

In $\frac{1}{4}$ Mode, CCD 106 is directly connected to no more than nine Level 1 devices, where Spokes 1–3 cannot be used. In $\frac{1}{4}$ Mode, if a Level 1 device is connected to CCD 106 via Spoke 0, it is allocated one fourth of the address bandwidth available at CCD 106, while up to another eight Level 1 devices may be connected to CCD 106 via Spokes 4–11 and are each allocated one sixteenth of the CCD's address bandwidth. Effectively, the address bandwidths for Spokes 0–3 in Native Mode are all allocated to Spoke 0 in $\frac{1}{4}$ Mode.

In $\frac{1}{2}$ Mode, CCD 106 is directly connected to no more than five Level 1 devices, where Spokes 1–7 cannot be used. In $\frac{1}{2}$ Mode, if a Level 1 device is connected to CCD 106 via Spoke 0, it is allocated one half of the address bandwidth available at CCD 106, while up to another four Level 1 devices may be connected to CCD 106 via Spokes 8–11 and are each allocated one sixteenth of the CCD's address bandwidth. Effectively, the address bandwidths for Spokes 0–7 in Native Mode are all allocated to Spoke 0 in $\frac{1}{2}$ Mode.

In Clear Channel Mode, CCD 106 may be directly connected to only one Level 1 device, where Spokes 1–11 are not used. In Clear Channel Mode, if a Level 1 device is connected to CCD 106 via Spoke 0, it is allocated all of the address bandwidth available at CCD 106. In each of the modes, except the Clear Channel Mode, only $\frac{12}{16}$ or $\frac{3}{4}$ of the CCD's available address bandwidth is allocated to the Level 1 devices. In these modes, some of the remaining bandwidth (e.g., equivalent to one spoke) is reserved for communication overhead between the various devices in the architecture, while the rest of the bandwidth is left unutilized. In Clear Channel Mode, however, since only one Level 1 device can be connected directly to CCD 106, all of the address bandwidth available at CCD 106 can be allocated to that one Level 1 device.

The five configuration modes of Table I also apply to each CAD 108 in Levels 1, 2, and 3 of FIG. 1. Thus, whatever address bandwidth is available at a particular CAD can be distributed to the devices at the next lower level (where, for example, Level 2 is "lower" than Level 1) based on the configuration mode selected for that particular CAD. CCD 106 and each of CADs 108 are independently configurable in any of the five configuration modes.

The flexible address bandwidth allocation scheme of the present invention can be implemented in an extremely wide variety of particular architectures to support a wide range of processing requirements. Assume, for example, that processor 102 has an available address bandwidth of 16 megabytes (Mbytes). In that case, CCD 106 has 16 Mbytes of address bandwidth available for distribution to the Level 1 devices. Depending on the particular configuration mode, a Level 1 device may be allocated an address bandwidth of either 1 Mbyte, 2 Mbytes, 4 Mbytes, 8 Mbytes, or 16 Mbytes, as defined in Table II.

address bandwidth from CCD 106 and depending on its own configuration mode, the Level 2 devices connected directly to that particular Level 1 CAD may be allocated an address bandwidth of either 64 Kilobytes (Kbytes), 128 Kbytes, 256 Kbytes, 512 KBytes, 1 Mbyte, 2 Mbytes, 4 Mbytes, 8 Mbytes, or 16 Mbytes, as defined in Table III.

This exponential expansion can be extended by analogy to the Level 3 and Level 4 devices. As a result, for a particular Level 2 CAD 108, depending on how much address bandwidth was allocated from CCD 106 to the corresponding Level 1 CAD and depending how much of that address bandwidth was then allocated from the Level 1 CAD to the particular Level 2 CAD and depending on the configuration mode selected for the particular Level 2 CAD, the Level 3 devices connected directly to the particular Level 2 CAD may be allocated an address bandwidth of either 4 Kbytes, 8 Kbytes, 16 Kbytes, 32 Kbytes, 64 Kbytes, 128 Kbytes, 256 Kbytes, 512 KBytes, 1 Mbyte, 2 Mbytes, 4 Mbytes, 8 Mbytes, or 16 Mbytes.

TABLE II

Level 1 Address Bandwidth Allocation For 16-Mbyte Processor

| | Spoke | | | | | | | | | | | |
|---|---|---|---|---|---|---|---|---|---|---|---|---|
| Mode | 0 | 1 | 2 | 3 | 4 | 5 | 6 | 7 | 8 | 9 | 10 | 11 |
| 1/16 | 1 M | 1 M | 1 M | 1 M | 1 M | 1 M | 1 M | 1 M | 1 M | 1 M | 1 M | 1 M |
| 1/8 | 2 M | — | 1 M | 1 M | 1 M | 1 M | 1 M | 1 M | 1 M | 1 M | 1 M | 1 M |
| 1/4 | 4 M | — | — | — | 1 M | 1 M | 1 M | 1 M | 1 M | 1 M | 1 M | 1 M |
| 1/2 | 8 M | — | — | — | — | — | — | — | 1 M | 1 M | 1 M | 1 M |
| CC | 16 M | — | — | — | — | — | — | — | — | — | — | — |

Similarly, for a particular Level 1 CAD 108, depending on whether it has been allocated 1, 2, 4, 8, or 16 Mbytes of

TABLE III

Level 2 Address Bandwidth Allocation for 16-Mbyte Processor

| | | Spoke | | | | | | | | | | | |
|---|---|---|---|---|---|---|---|---|---|---|---|---|---|
| B/W In | Mode | 0 | 1 | 2 | 3 | 24 | 5 | 6 | 7 | 8 | 9 | 10 | 11 |
| 1 M | 1/16 | 64 K | 64 K | 64 K | 64 K | 64 K | 64 K | 64 K | 64 K | 64 K | 64 K | 64 K | 64 K |
| 1 M | 1/8 | 128 K | 64 K | 64 K | 64 K | 64 K | 64 K | 64 K | 64 K | 64 K | 64 K | 64 K | 64 K |
| 1 M | 1/4 | 256 K | — | — | — | 64 K | 64 K | 64 K | 64 K | 64 K | 64 K | 64 K | 64 K |
| 1 M | 1/2 | 512 K | — | — | — | — | — | — | 64 K | 64 K | 64 K | 64 K | 64 K |
| 1 M | CC | 1 M | — | — | — | — | — | — | — | — | — | — | — |
| 2 M | 1/16 | 128 K | 128 K | 128 K | 128 K | 128 K | 128 K | 128 K | 128 K | 128 K | 128 K | 128 K | 128 K |
| 2 M | 1/8 | 256 K | 128 K | 128 K | 128 K | 128 K | 128 K | 128 K | 128 K | 128 K | 128 K | 128 K | 128 K |
| 2 M | 1/4 | 512 K | — | — | — | 128 K | 128 K | 128 K | 128 K | 128 K | 128 K | 128 K | 128 K |
| 2 M | 1/2 | 1 M | — | — | — | — | — | — | — | 128 K | 128 K | 128 K | 128 K |
| 2 M | CC | 2 M | — | — | — | — | — | — | — | — | — | — | — |
| 4 M | 1/16 | 256 K | 256 K | 256 K | 256 K | 256 K | 256 K | 256 K | 256 K | 256 K | 256 K | 256 K | 256 K |
| 4 M | 1/8 | 512 K | — | 256 K | 256 K | 256 K | 256 K | 256 K | 256 K | 256 K | 256 K | 256 K | 256 K |
| 4 M | 1/4 | 1 M | — | — | 256 K | 256 K | 256 K | 256 K | 256 K | 256 K | 256 K | 256 K | 256 K |
| 4 M | 1/2 | 2 M | — | — | — | — | — | — | — | 256 K | 256 K | 256 K | 256 K |
| 4 M | CC | 4 M | — | — | — | — | — | — | — | — | — | — | — |
| 8 M | 1/16 | 512 K | 512 K | 512 K | 512 K | 512 K | 512 K | 512 K | 512 K | 512 K | 512 K | 512 K | 512 K |
| 8 M | 1/8 | 1 M | — | 512 K | 512 K | 512 K | 512 K | 512 K | 512 K | 512 K | 512 K | 512 K | 512 K |
| 8 M | 1/4 | 2 M | — | — | — | 512 K | 512 K | 512 K | 512 K | 512 K | 512 K | 512 K | 512 K |
| 8 M | 1/2 | 4 M | — | — | — | — | — | — | — | 512 K | 512 K | 512 K | 512 K |
| 8 M | CC | 8 M | — | — | — | — | — | — | — | — | — | — | — |
| 16 M | 1/16 | 1 M | 1 M | 1 M | 1 M | 1 M | 1 M | 1 M | 1 M | 1 M | 1 M | 1 M | 1 M |
| 16 M | 1/8 | 2 M | — | 1 M | 1 M | 1 M | 1 M | 1 M | 1 M | 1 M | 1 M | 1 M | 1 M |
| 16 M | 1/4 | 4 M | — | — | — | 1 M | 1 M | 1 M | 1 M | 1 M | 1 M | 1 M | 1 M |
| 16 M | 1/2 | 8 M | — | — | — | — | — | — | — | 1 M | 1 M | 1 M | 1 M |
| 16 M | CC | 16 M | — | — | — | — | — | — | — | — | — | — | — |

Similarly, for a particular Level 3 CAD 108, depending on how much address bandwidth was allocated from CCD 106 to the corresponding Level 1 CAD and depending how much of that address bandwidth was then allocated from the Level 1 CAD to the corresponding Level 2 CAD and depending on how much of that address bandwidth was then allocated from the Level 2 CAD to the particular Level 3 CAD and depending on the configuration mode selected for the particular Level 3 CAD, the controlled devices 104 connected directly to the particular Level 3 CAD may be allocated an address bandwidth of either 256 bytes, 512 bytes, 1 Kbyte, 2 Kbytes, 4 Kbytes, 8 Kbytes, 16 Kbytes, 32 Kbytes, 64 Kbytes, 128 Kbytes, 256 Kbytes, 512 KBytes, 1 Mbyte, 2 Mbytes, 4 Mbytes, 8 Mbytes, or 16 Mbytes.

The flexible address bandwidth allocation scheme can support an extremely wide variety of different architectures, everything from a single controlled device 104 that is allocated all 16 Mbytes of address bandwidth to a "full" network of 20,736 controlled devices 104, each of which is allocated 256 bytes of address bandwidth.

Figure 2:
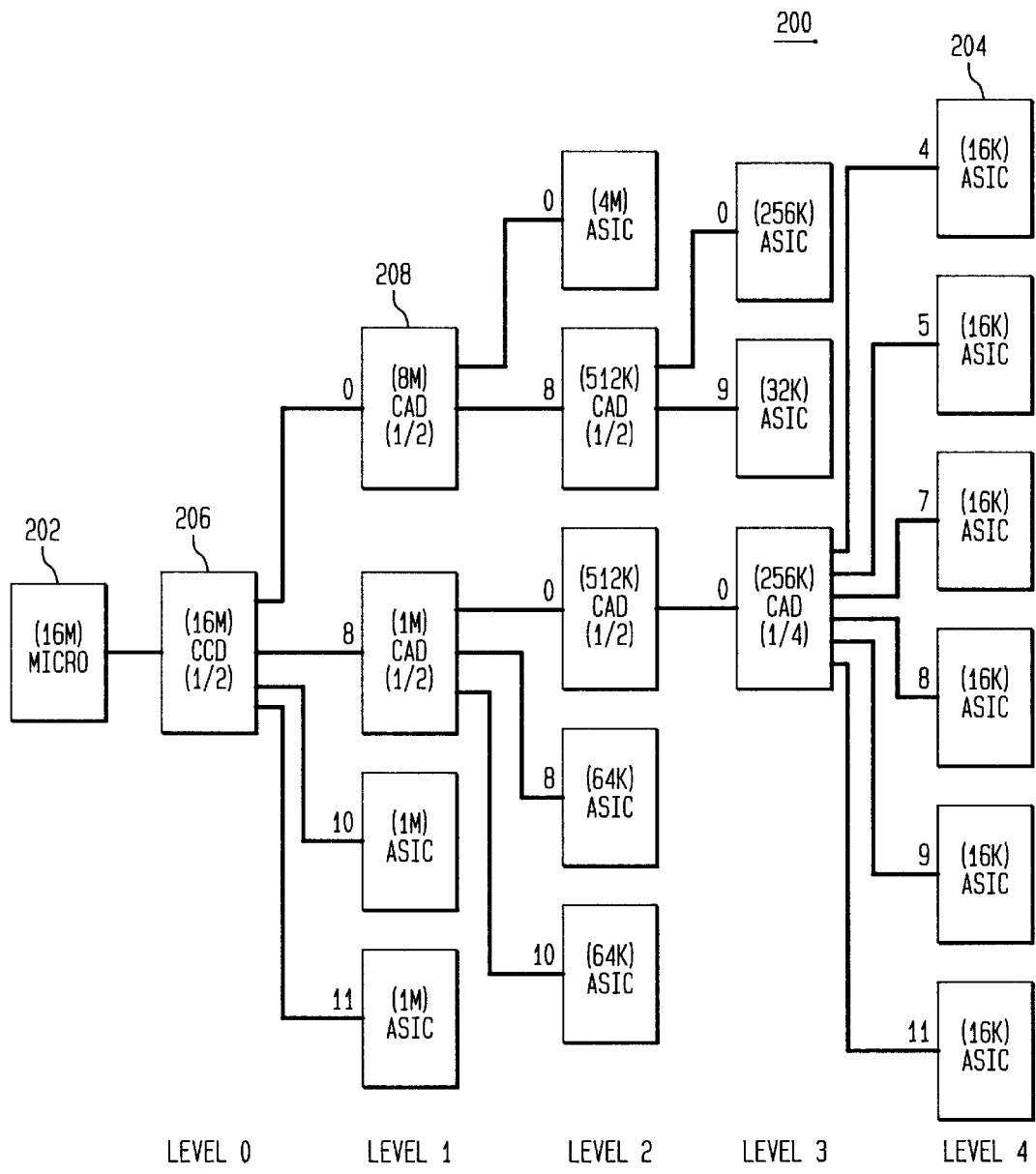
FIG. 2 provides an example of one particular architecture that can be implemented under the flexible address bandwidth allocation scheme of the present invention.

FIG. 2 provides an example of one particular architecture 200 that can be implemented under the flexible address bandwidth allocation scheme of the present invention. Architecture 200 provides connections between a 16-Mbyte microprocessor 202 and thirteen ASICs 204 using a CCD 206 and five CADs 208. The configuration modes of the CCD and the five CADs are selected to provide the thirteen ASICs with different levels of allocated address bandwidth (intended to satisfy their individual processing requirements). For CCD 206 and each CAD 208, FIG. 2 identifies the amount of address bandwidth available at the device and the configuration mode selected for the device. For example, CCD 206 has 16 Mbytes of address bandwidth available and is configured in ½ Mode. Similarly, for each ASIC 204, FIG. 2 identifies the amount of address bandwidth allocated to the ASIC. For example, the ASIC at the top of Level 2 in FIG. 2 is allocated 4 Mbytes of address bandwidth. FIG. 2 also identifies the ID numbers of the spokes used to connect the various devices. Architecture 200 indicates the variability of architectures that can be implemented under the present invention.

Control Propagation

In order to support 16 Mbytes of address bandwidth on a byte-by-byte basis, the addresses for an architecture, such as the architecture of FIG. 1, need to have at least 24 bits (where 224 bytes=16 Mbytes). The CCD receives 24 bits of address from the control function (e.g., processor 102 in FIG. 1). Table IV shows the memory map, according to one embodiment of the present invention.

The architecture of FIG. 1 can support one CCD and up to 1884 CADs (i.e., 12 in Level 1 plus $12^2$ or 144 in Level 2 plus $12^3$ or 1728 in Level 3). The control function must be able to uniquely and individually access the internal registers of the CCD and each CAD. In one implementation of the present invention, each of the CCD and CADs has 256 bytes of internal registers used for controlling the operations of the device. Table IV shows the addresses reserved for internal registers of the CCD and each possible CAD.

The memory map of Table IV enables each CAD to be implemented using the same hardware design independent of the interface level in which the CAD resides. Each CAD knows what level it is on and each CAD is aware of the memory map of Table IV. When a CAD in Level receives an address that it recognizes as corresponding to an internal register in one of its sub-tending CADs, the CAD in Level i modifies the address bits such that the address sent to the sub-tending CAD will be decoded in its memory map as control information. In this way, the same 256-byte region (i.e., 0xFFFF00-0xFFFFFF) can be used for the internal registers of each CAD. In this way, the memory map of Table IV enables a single hardware design to be used for each CAD independent of the level of the CAD in the interface.

TABLE IV

MEMORY MAP

| ADDRESS RANGE (HEX) | WHAT IS ACCESSED |
|---|---|
| 0x000000–0xEFFFFFF | CCD Spoke 0 Clear Channel Mode |
| 0x000000–0x0FFFFF | CCD Spoke 0 Native Mode (Data Access) |
| 0x100000–0x1FFFFF | CCD Spoke 1 Native Mode (Data Access) |
| . . . | . . . |
| 0xA00000–0xAFFFFF | CCD Spoke 10 Native Mode (Data Access) |
| 0xB00000–0xBFFFFF | CCD Spoke 11 Native Mode (Data Access) |
| 0xF0FF00–0xF0FFFF | Internal Registers of Level 1 CAD Residing on CCD Spoke 0 |
| 0xF1FF00–0xF1FFFF | Internal Registers of Level 1 CAD Residing on CCD Spoke 1 |
| . . . | . . . |
| 0xFAFF00–0xFAFFFF | Internal Registers of Level 1 CAD Residing on CCD Spoke 10 |
| 0xFBFF00–0xFBFFFF | Internal Registers of Level 1 CAD Residing on CCD Spoke 11 |
| 0xF00F00–0xF00FFF | Internal Registers of Level 2 CAD Residing on Level 1 CAD Spoke 0 Residing on CCD Spoke 0 |
| 0xF01F00–0xF01FFF | Internal Registers of Level 2 CAD Residing on Level 1 CAD Spoke 1 Residing on CCD Spoke 0 |
| . . . | . . . |
| 0xF0BF00–0xF0BFFF | Internal Registers of Level 2 CAD Residing on Level 1 CAD Spoke 11 Residing on CCD Spoke 0 |
| 0xF10F00–0xF10FFF | Internal Registers of Level 2 CAD Residing on Level 1 CAD Spoke 0 Residing on CCD Spoke 1 |
| . . . | . . . |
| 0xFBAF00–0xFBAFFF | Internal Registers of Level 2 CAD Residing on Level 1 CAD Spoke 10 Residing on CCD Spoke 11 |
| 0xFBBF00–0xFBBFFF | Internal Registers of Level 2 CAD Residing on Level 1 CAD Spoke 11 Residing on CCD Spoke 11 |
| 0xF00000–0xF000FF | Internal Registers of Level 3 CAD Residing on Level 2 CAD Spoke 0 Residing on Level 1 CAD Spoke 0 Residing on CCD Spoke 0 |
| 0xF00100–0xF001FF | Internal Registers of Level 3 CAD Residing on Level 2 CAD Spoke 1 Residing on Level 1 CAD Spoke 0 Residing on CCD Spoke 0 |
| . . . | . . . |
| 0xFBBA00–0xFBBAFF | Internal Registers of Level 3 CAD Residing on Level 2 CAD Spoke 10 Residing on Level 1 CAD Spoke 11 Residing on CCD Spoke 11 |
| 0xFBBB00–0xFBBBFF | Internal Registers of Level 3 CAD Residing on Level 2 CAD Spoke 11 Residing on Level 1 CAD Spoke 11 Residing on CCD Spoke 11 |
| 0xFFFF00–0xFFFFFF | CCD Internal Registers |

Address Bit Manipulation

As mentioned in the previous section, in order to support 16 Mbytes of address bandwidth on a byte-by-byte basis, the addresses for an architecture such as architecture 200 of FIG. 2 need to have at least 24 bits (where 224 bytes=16 Mbytes). A 24-bit address A[24] may be represented as follows:

$$A(23)\ A(22)\ A(21)\ \ldots\ A(2)\ A(1)\ A(0)$$

where A(23) is the most significant bit (MSB) and A(0) is the least significant bit (LSB).

According to one embodiment of the present invention, a CCD uses address bits A(23)–A(20) to determine the spoke selection, where the number of available spokes may be traded off for additional address bandwidth on Spoke 0 by selecting an appropriate configuration mode for the CCD. The manipulation of bits for each 24-bit address A[24] by the CCD for each configuration mode is summarized in Table V.

In Native Mode, for example, a value for bits A(23)–A(20) of (0000) may correspond to addresses allocated to Spoke 0, a value of (0001) corresponds to addresses allocated to Spoke 1, and so on up to a value of (1011) corresponding to addresses allocated to Spoke 11. The remaining 20 bits A(19)–A(0) of each address A[24] provide each spoke with $2^{20}$ or 1 Mbytes of addressable memory. In the downstream direction (i.e., from the processor to the Level 1 devices), for each address A[24], the CCD zeroes out the value of bits A(23)–A(20) for each of Spokes 0–11 and passes the remaining 20 bits A(19)–A(0) to the appropriate spoke.

TABLE V

CCD ADDRESS-BIT MANIPULATION

| CONFIGURATION MODE | SPOKE 0 | OTHER SPOKES |
|---|---|---|
| Native or 1/16 | Zero out A(23)–A(20) | Zero out A(23)–A(20) |
| 1/8 | Zero out A(23)–A(21); Pass A(20) | Zero out A(23)–A(20) |
| 1/4 | Zero out A(23)–A(22); Pass A(21)–A(20) | Zero out A(23)–A(20) |
| 1/2 | Zero out A(23); Pass A(22)–A(20) | Zero out A(23)–A(20) |
| Clear Channel | Pass A(23)–A(20) | Not Applicable |

In 1/8 Mode, a value for bits A(23)–A(20) of either (0000) or (0001) corresponds to addresses allocated to Spoke 0, a value of (0010) corresponds to addresses allocated to Spoke 2, and so on up to a value of (1011) corresponding to addresses allocated to Spoke 11. This provides Spoke 0 with $2^{21}$ or 2 Mbytes of addressable memory, while providing each of Spokes 2–11 with 1 Mbyte of address space. In the downstream direction, for each address A[24], the CCD zeroes out the value of bits A(23)–A(21) for Spoke 0 and passes the remaining 21 bits A(20)–A(0) to the Level 1 device connected via Spoke 0. As in Native Mode, in the downstream direction for each of Spokes 2–11, the CCD zeroes out the value of bits A(23)–A(20) and passes the remaining 20 bits A(19)–A(0).

In 1/4 Mode, a value for bits A(23)–A(20) of either (0000), (0001), (0010), or (0011) corresponds to addresses allocated to Spoke 0, a value of (0100) corresponds to addresses allocated to Spoke 4, and so on up to a value of (1011) corresponding to addresses allocated to Spoke 11. This provides Spoke 0 with $2^{22}$ or 4 Mbytes of addressable memory, while providing each of Spokes 4–11 with 1 Mbyte of address space. In the downstream direction, for each address A[24], the CCD zeroes out the value of bits A(23)–A(22) for Spoke 0 and passes the remaining 22 bits A(21)–A(0) to the Level 1 device connected via Spoke 0. As in Native Mode, in the downstream direction for each of Spokes 4–11, the CCD zeroes out the value of bits A(23)–A(20) and passes the remaining 20 bits A(19)–A(0).

In 1/2 Mode, a value for bits A(23)–A(20) of from (0000) to (0111) corresponds to addresses allocated to Spoke 0, a value of (1000) corresponds to addresses allocated to Spoke 8, and so on up to a value of (1011) corresponding to addresses allocated to Spoke 11. This provides Spoke 0 with $2^{23}$ or 8 Mbytes of addressable memory, while providing each of Spokes 8–11 with 1 Mbyte of address space. In the downstream direction, for each address A[24], the CCD zeroes out the value of bit A(23) for Spoke 0 and passes the remaining 23 bits A(22)–A(0) to the Level 1 device connected via Spoke 0. As in Native Mode, in the downstream direction for each of Spokes 8–11, the CCD zeroes out the value of bits A(23)–A(20) and passes the remaining 20 bits A(19)–A(0).

In Clear Channel Mode, all values for bits A(23)–A(20) of from (0000) to (1111) correspond to addresses allocated to Spoke 0, and none of the other spokes are available. This provides Spoke 0 with all $2^{24}$ or 16 Mbytes of addressable memory. In the downstream direction, for each address A[24], the CCD passes all 23 bits A(23)–A(0) to the Level 1 device connected via Spoke 0.

In analogous fashion, each Level 1 CAD manipulates four address bits that can be used to trade off the number of available spokes for additional address bandwidth on its Spoke 0 based on the configuration mode selected for the Level 1 CAD. The only difference is that the particular four address bits that a Level 1 CAD manipulates depends on how much address bandwidth has been allocated to the Level 1 CAD by the CCD. Since any Level 1 CAD that is connected to the CCD via any of CCD Spokes 1–11 will always receive the 20 bits A(19)–A(0) of address A[24] corresponding to 1 Mbyte bandwidth, these Level 1 CADs always manipulate bits A(19)–A(16). However, a Level 1 CAD that is connected to the CCD via CCD Spoke 0 may receive anywhere from 20 bits to all 24 bits of address A[24] corresponding to from 1 Mbyte to all 16 Mbytes of address bandwidth, respectively, depending on the configuration mode of the CCD. As such, the particular four address bits that are manipulated by a Level 1 CAD connected to the CCD via CCD Spoke 0 will depend on the configuration mode of the CCD as follows.

For a Level 1 CAD connected to the CCD via CCD Spoke 0, if the CCD is in Native Mode, the Level 1 CAD will receive addresses having the 20 bits A(19)–A(0). In this case, the Level 1 CAD manipulates bits A(19)–A(16) for its own bandwidth allocation to Level 2 devices.

If the CCD is in 1/8 Mode, a Level 1 CAD connected to the CCD via Spoke 0 will receive addresses having the 21 bits A(20)–A(0). In this case, the Level 1 CAD manipulates bits A(20)–A(17) for its bandwidth allocation to Level 2 devices.

If the CCD is in 1/4 Mode, a Level 1 CAD connected to the CCD via Spoke 0 will receive addresses having the 22 bits A(21)–A(0). In this case, the Level 1 CAD manipulates bits A(21)–A(18) for its bandwidth allocation to Level 2 devices.

If the CCD is in 1/2 Mode, a Level 1 CAD connected to the CCD via Spoke 0 will receive addresses having the 23 bits A(22)–A(0). In this case, the Level 1 CAD manipulates bits A(22)–A(19) for its bandwidth allocation to Level 2 devices.

If the CCD is in Clear Channel Mode, a Level 1 CAD connected to the CCD via Spoke 0 will receive addresses having all 24 bits A(23)–A(0). In this case, the Level 1 CAD manipulates bits A(23)–A(20) for its bandwidth allocation to Level 2 devices.

In general, a Level 1 CAD connected to the CCD via Spoke 0 will manipulate bits A(x)–A(x-3), where x is the most significant bit in the addresses received from the CCD. This same principle can be extended to other Level 1 CADs as well as to all Level 2 and Level 3 CADs. As such, the following more general statement can be made for any CAD at any level: A CAD will manipulate bits A(x) to A(x-3), where x is the most significant bit in the addresses passed from the corresponding higher-level bandwidth distribution device (i.e., the CCD or a CAD). Table VI applies this general statement to describe the manipulation of address bits for the various configuration modes of any CAD. Each CAD zeroes out appropriate bits in the downstream direction depending on the amount of address bandwidth it has been allocated and its own configuration mode.

TABLE VI

CAD ADDRESS-BIT MANIPULATION

| CONFIGURATION MODE | SPOKE 0 | OTHER SPOKES |
|---|---|---|
| Native or 1/16 | Zero out A(x)–A(x − 3) | Zero out A(x)–A(x − 3) |
| 1/8 | Zero out A(x)–A(x − 2); Pass A(x − 3) | Zero out A(x)–A(x − 3) |
| 1/4 | Zero out A(x)–A(x − 1); Pass A(x − 2)–A(x − 3) | Zero out A(x)–A(x − 3) |
| 1/2 | Zero out A(x); Pass A(x − 1)–A(x − 3) | Zero out A(x)–A(x − 3) |
| Clear Channel | Pass A(x)–A(x − 3) | Not Applicable |

Exemplary Configurations

The interface scheme of the present invention can be used to implement a wide range of hardware configurations. Referring again to FIG. 1, in some configurations, processor 102, controlled devices 104, CCD 106, and CADs 108 are all implemented on a single circuit board. However, since the CADs and the controlled devices (e.g., ASICs) are slaves to the master CCD, they can be implemented separate from the CCD on other circuit boards that need not have their own processors. As such, the present invention also supports configurations in which one or more CADs and/or one or more controlled devices are implemented on one or more circuit boards different from the circuit board that has the processor and the CCD, where these other circuit boards may or may not have their own processors. In these configurations, the circuit board with the processor and the CCD may also have other CADs and/or controlled devices. The present invention, therefore, provides a high degree of flexibility that can be incorporated into the design of circuit boards.

Alternative Embodiments

The present invention has been described in the context of telecommunications applications in which a microprocessor can be connected to one or more ASICs via an interface having a CCD and one or more CADs, where the processor has 16 Mbytes of address space, each bandwidth distribution device (i.e., the CCD and each CAD) can be connected to up to 12 lower-level devices, there are up to 3 levels of CADs, and each bandwidth distribution device can be configured in any one of five specific configuration modes. Those skilled in the art will understand that the present invention can also be implemented in other contexts. In general, the amount of processor address space, the number of spokes per CCD/CAD, the maximum number of levels of CADs, and/or the number and definitions of the various configuration modes can all differ from context to context. Moreover, the present invention can be implemented for any application in which there is a need for a hierarchy of control, such as between components in a personal computers as well as between computers in computer networks, such as local area networks or intranets and wide area networks or internets.

Moreover, the present invention can be used to connect a processor other than a microprocessor to controlled devices other than ASICs. In particular, the processor can be any suitable processing device or stored program machine, such as a microprocessor, a digital signal processor (DSP), a field programmable gate array (FPGA), a mask programmable gate array (MPGA), while the controlled devices can be any suitable devices that does not have embedded control. In addition, in a particular configuration, two or more different types of controlled devices can be connected to a processor using the interface of the present invention. The CCD and CADs can be implemented in hardware, in software, or in any suitable combination of hardware and software.

Similarly, although the invention has been described in the context of distribution of address bandwidth, the present invention can be applied to the allocation of other types of bandwidth, such as transmission bandwidth or processing bandwidth (e.g., CPU time).

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An interface for connecting a processor to one or more controlled devices, the interface comprising a plurality of bandwidth distribution devices arranged in two or more levels, wherein each bandwidth distribution device in each level has an allocation of available address bandwidth of the processor core and is configurable in a plurality of configuration modes that determine how the available address bandwidth is allocated to one or more devices in the next lower level, wherein each of the one or more devices in the next lower level is either another bandwidth distribution device or a controlled device.

2. The invention of claim 1, wherein the plurality of bandwidth distribution devices comprises a controller device and one or more adjunct devices, wherein:

the controller device is allocated address bandwidth from the processor and distributes its allocation of address bandwidth to one or more devices in the next lower level, wherein each of the one or more devices in the next lower level is either an adjunct device or a controlled device; and each adjunct device is allocated address bandwidth from a bandwidth distribution device in the next higher level and distributes its allocation of address bandwidth to one or more devices in the next lower level, wherein each of the one or more devices in the next lower level is either an adjunct device or a controlled device.

3. The invention of claim 2, wherein the interface has a maximum of three different levels that comprise one or more adjunct devices.

4. The invention of claim 2, wherein each bandwidth distribution device is connected to a maximum of twelve different devices in the next lower level.

5. The invention of claim 2, wherein each adjunct device has the same hardware design independent of its level.

6. The invention of claim 1, wherein, for a given bandwidth distribution device, the configuration modes comprise:

a native mode in which each device in the next lower level is allocated a specified fraction of the available address bandwidth;

a clear channel mode in which a single device in the next lower level is allocated all of the available address bandwidth; and one or more fractional modes in which one device in the next lower level can be allocated an integer multiple of the specified fraction of address bandwidth, wherein the integer is greater than one, and each of one or more other devices in the next lower level can be allocated the specified fraction of the available address bandwidth.

7. The invention of claim 1, wherein the processor, the one or more controlled devices, and the one or more bandwidth distribution devices are implemented on two or more different circuit boards.

8. The invention of claim 7, wherein one or more bandwidth distribution devices and one or more controlled devices are implemented on one or more circuit boards without other processors.

9. The invention of claim 1, wherein, in the downstream direction, except for clear channel mode, each bandwidth distribution device erases one or more address bits in each processor address, while retaining one or more other address bits in each processor address depending on its configuration mode.

10. The invention of claim 9, wherein the one or more address bits to be erased by each bandwidth distribution device are selected based on the address bandwidth allocated to the bandwidth distribution device and the configuration mode of the bandwidth distribution device.

11. The invention of claim 1, wherein:
the plurality of bandwidth distribution devices comprises a controller device and one or more adjunct devices;
the controller device is allocated address bandwidth from the processor and distributes its allocation of address bandwidth to up to twelve devices in a first level, wherein each of the devices in the first level is either an adjunct device or a controlled device;
if the first level has one or more adjunct devices, then each adjunct device in the first level is allocated address bandwidth from the controller device and distributes its allocation of address bandwidth to up to twelve devices in a second level, wherein each of the devices in the second level is either an adjunct device or a controlled device;
if the second level has one or more adjunct devices, then each adjunct device in the second level is allocated address bandwidth from the corresponding adjunct device in the first level and distributes its allocation of address bandwidth to up to twelve devices in a third level, wherein each of the devices in the third level is either an adjunct device or a controlled device;
if the third level has one or more adjunct devices, then each adjunct device in the third level is allocated address bandwidth from the corresponding adjunct device in the second level and distributes its allocation of address bandwidth to up to twelve devices in a fourth level, wherein each of the devices in the fourth level is a controlled device; and
each adjunct device has the same hardware design independent of its level.

12. The invention of claim 11, wherein the controller device and each adjunct device can be configured independently in one of the following configuration modes:
a native mode in which each device in the next lower level receives one sixteenth of the available address bandwidth;
a ⅛ mode in which one device in the next lower level can receive one eighth of the available address bandwidth and up to ten other devices in the next lower level can receive one sixteenth of the available address bandwidth;
a ¼ mode in which one device in the next lower level can receive one fourth of the available address bandwidth and up to eight other devices in the next lower level can receive one sixteenth of the available address bandwidth;
a ½ mode in which one device in the next lower level can receive one half of the available address bandwidth and up to four other devices in the next lower level can receive one sixteenth of the available address bandwidth; and
a clear channel mode in which a single device in the next lower level can receive all of the available address bandwidth.

13. The invention of claim 11, wherein the processor, the one or more controlled devices, the controller device, and the one or more adjunct devices are implemented on two or more different circuit boards, wherein one or more adjunct devices and one or more controlled devices are implemented on one or more circuit boards without other processors.

14. The invention of claim 11, wherein, in the downstream direction, the controller device and each adjunct device erases up to four address bits depending on its configuration mode, wherein the up to four address bits to be erased by the device are selected based on the address bandwidth allocated to the device and the configuration mode of the device.

15. A computer network comprising a processor connected to one or more controlled devices via an interface, wherein the interface comprises a plurality of bandwidth distribution devices arranged in two or more levels, wherein each bandwidth distribution device in each level has an allocation of available address bandwidth of the processor core and is configurable in a plurality of configuration modes that determine how the available address bandwidth is allocated to one or more devices in the next lower level, wherein each of the one or more devices in the next lower level is either another bandwidth distribution device or a controlled device.

16. The invention of claim 15, wherein the plurality of bandwidth distribution devices comprises a controller device and one or more adjunct devices, wherein:
the controller device is allocated address bandwidth from the processor and distributes its allocation of address bandwidth to one or more devices in the next lower level, wherein each of the one or more devices in the next lower level is either an adjunct device or a controlled device; and
each adjunct device is allocated address bandwidth from a bandwidth distribution device in the next higher level and distributes its allocation of address bandwidth to one or more devices in the next lower level, wherein each of the one or more devices in the next lower level is either an adjunct device or a controlled device.

17. The invention of claim 16, wherein the interface has a maximum of three different levels that comprise one or more adjunct devices.

18. The invention of claim 16, wherein each bandwidth distribution device is connected to a maximum of twelve different devices in the next lower level.

19. The invention of claim 16, wherein each adjunct device has the same hardware design independent of its level.

20. The invention of claim 15, wherein, for a given bandwidth distribution device, the configuration modes comprise:
a native mode in which each device in the next lower level is allocated a specified fraction of the available address bandwidth;
a clear channel mode in which a single device in the next lower level is allocated all of the available address bandwidth; and
one or more fractional modes in which one device in the next lower level can be allocated an integer multiple of the specified fraction of address bandwidth, wherein the integer is greater than one, and each of one or more other devices in the next lower level can be allocated the specified fraction of the available address bandwidth.

21. The invention of claim 15, wherein the processor, the one or more controlled devices, and the one or more bandwidth distribution devices are implemented on two or more different circuit boards.

22. The invention of claim 21, wherein one or more bandwidth distribution devices and one or more controlled devices are implemented on one or more circuit boards without other processors.

23. The invention of claim 15, wherein, in the downstream direction, except for clear channel mode, each bandwidth distribution device erases one or more address bits in each processor address, while retaining one or more other address bits in each processor address depending on its configuration mode.

24. The invention of claim 23, wherein the one or more address bits to be erased by each bandwidth distribution device are selected based on the address bandwidth allocated to the bandwidth distribution device and the configuration mode of the bandwidth distribution device.

25. The invention of claim 15, wherein:

the plurality of bandwidth distribution devices comprises a controller device and one or more adjunct devices;

the controller device is allocated address bandwidth from the processor and distributes its allocation of address bandwidth to up to twelve devices in a first level, wherein each of the devices in the first level is either an adjunct device or a controlled device;

if the first level has one or more adjunct devices, then each adjunct device in the first level is allocated address bandwidth from the controller device and distributes its allocation of address bandwidth to up to twelve devices in a second level, wherein each of the devices in the second level is either an adjunct device or a controlled device;

if the second level has one or more adjunct devices, then each adjunct device in the second level is allocated address bandwidth from the corresponding adjunct device in the first level and distributes its allocation of address bandwidth to up to twelve devices in a third level, wherein each of the devices in the third level is either an adjunct device or a controlled device;

if the third level has one or more adjunct devices, then each adjunct device in the third level is allocated address bandwidth from the corresponding adjunct device in the second level and distributes its allocation of address bandwidth to up to twelve devices in a fourth level, wherein each of the devices in the fourth level is a controlled device; and each adjunct device has the same hardware design independent of its level.

26. The invention of claim 25, wherein the controller device and each adjunct device can be configured independently in one of the following configuration modes:

a native mode in which each device in the next lower level receives one sixteenth of the available address bandwidth;

a ⅛ mode in which one device in the next lower level can receive one eighth of the available address bandwidth and up to ten other devices in the next lower level can receive one sixteenth of the available address bandwidth;

a ¼ mode in which one device in the next lower level can receive one fourth of the available address bandwidth and up to eight other devices in the next lower level can receive one sixteenth of the available address bandwidth;

a ½ mode in which one device in the next lower level can receive one half of the available address bandwidth and up to four other devices in the next lower level can receive one sixteenth of the available address bandwidth; and a clear channel mode in which a single device in the next lower level can receive all of the available address bandwidth.

27. The invention of claim 25, wherein the processor, the one or more controlled devices, the controller device, and the one or more adjunct devices are implemented on two or more different circuit boards, wherein one or more adjunct devices and one or more controlled devices are implemented on one or more circuit boards without other processors.

28. The invention of claim 25, wherein, in the downstream direction, the controller device and each adjunct device erases up to four address bits depending on its configuration mode, wherein the up to four address bits to be erased by the device are selected based on the address bandwidth allocated to the device and the configuration mode of the device.

29. An interface for connecting a processor to one or more controlled devices, the interface comprising a plurality of bandwidth distribution devices arranged in two or more levels, wherein each bandwidth distribution device in each level has an allocation of available bandwidth and is configurable in a plurality of configuration modes that determine how the available bandwidth is allocated to one or more devices in the next lower level, wherein each of the one or more devices in the next lower level is either another bandwidth distribution device or a controlled device, wherein:

the plurality of bandwidth distribution devices comprises a controller device and one or more adjunct devices;

the controller device is allocated bandwidth from the processor and distributes its allocation of bandwidth to up to twelve devices in a first level, wherein each of the devices in the first level is either an adjunct device or a controlled device;

if the first level has one or more adjunct devices, then each adjunct device in the first level is allocated bandwidth from the controller device and distributes its allocation of bandwidth to up to twelve devices in a second level, wherein each of the devices in the second level is either an adjunct device or a controlled device;

if the second level has one or more adjunct devices, then each adjunct device in the second level is allocated bandwidth from the corresponding adjunct device in the first level and distributes its allocation of bandwidth to up to twelve devices in a third level, wherein each of the devices in the third level is either an adjunct device or a controlled device;

if the third level has one or more adjunct devices, then each adjunct device in the third level is allocated bandwidth from the corresponding adjunct device in the second level and distributes its allocation of bandwidth to up to twelve devices in a fourth level, wherein each of the devices in the fourth level is a controlled device;

each adjunct device has the same hardware design independent of its level; and in the downstream direction, the controller device and each adjunct device erases up to four address bits depending on its configuration mode, wherein the up to four address bits to be erased by the device are selected based on the address bandwidth allocated to the device and the configuration mode of the device.

30. A computer network comprising a processor connected to one or more controlled devices via an interface, wherein the interface comprises a plurality of bandwidth distribution devices arranged in two or more levels, wherein each bandwidth distribution device in each level has an allocation of available bandwidth and is configurable in a plurality of configuration modes that determine how the available bandwidth is allocated to one or more devices in the next lower level, wherein each of the one or more devices in the next lower level is either another bandwidth distribution device or a controlled device, wherein:

the plurality of bandwidth distribution devices comprises a controller device and one or more adjunct devices;

the controller device is allocated bandwidth from the processor and distributes its allocation of bandwidth to up to twelve devices in a first level, wherein each of the devices in the first level is either an adjunct device or a controlled device;

if the first level has one or more adjunct devices, then each adjunct device in the first level is allocated bandwidth from the controller device and distributes its allocation of bandwidth to up to twelve devices in a second level, wherein each of the devices in the second level is either an adjunct device or a controlled device;

if the second level has one or more adjunct devices, then each adjunct device in the second level is allocated bandwidth from the corresponding adjunct device in the first level and distributes its allocation of bandwidth to up to twelve devices in a third level, wherein each of the devices in the third level is either an adjunct device or a controlled device;

if the third level has one or more adjunct devices, then each adjunct device in the third level is allocated bandwidth from the corresponding adjunct device in the second level and distributes its allocation of bandwidth to up to twelve devices in a fourth level, wherein each of the devices in the fourth level is a controlled device;

each adjunct device has the same hardware design independent of its level; and in the downstream direction, the controller device and each adjunct device erases up to four address bits depending on its configuration mode, wherein the up to four address bits to be erased by the device are selected based on the address bandwidth allocated to the device and the configuration mode of the device.

* * * * *